(12) United States Patent
Jenko (10) Patent No.: US 10,913,192 B2
(45) Date of Patent: Feb. 9, 2021

(54) INJECTION-MOLDING APPARATUSES CONTAINING INTEGRALLY FORMED THERMOCOUPLES

(71) Applicant: Husky Injection Molding Systems Ltd., Bolton (CA)

(72) Inventor: Edward Joseph Jenko, Essex, VT (US)

(73) Assignee: Husky Injection Molding Systems Ltd., Bolton (CA)

( * ) Notice: Subject to any disclaimer, the term of this patent is extended or adjusted under 35 U.S.C. 154(b) by 227 days.

(21) Appl. No.: 14/909,749

(22) PCT Filed: Sep. 12, 2014

(86) PCT No.: PCT/US2014/055291
§ 371 (c)(1),
(2) Date: Feb. 3, 2016

(87) PCT Pub. No.: WO2015/047743
PCT Pub. Date: Apr. 2, 2015

(65) Prior Publication Data
US 2016/0193770 A1 Jul. 7, 2016

Related U.S. Application Data

(60) Provisional application No. 61/884,070, filed on Sep. 29, 2013.

(51) Int. Cl.
*B29C 45/27* (2006.01)
*B29C 45/26* (2006.01)

(52) U.S. Cl.
CPC ............. *B29C 45/27* (2013.01); *B29C 45/26* (2013.01); *B29C 2945/7604* (2013.01);
(Continued)

(58) Field of Classification Search
None
See application file for complete search history.

(56) References Cited

U.S. PATENT DOCUMENTS 4,795,126 A * 1/1989 Crandell ............ B22D 17/2272
219/424
5,320,513 A 6/1994 Schmidt
(Continued)

FOREIGN PATENT DOCUMENTS

| EP | 0326016 A2 * | 8/1989 | ............. B29C 45/27 |
| EP | 000326016 A2 * | 9/1989 | |
| WO | 2012112262 A1 | 8/2012 | |

OTHER PUBLICATIONS

"Integral." Merriam-Webster.com. Merriam-Webster, 2nd. Friday. Nov. 30, 2018, https://www.merriam-webster.com/dictionary/integrally (Year: 2018).*
(Continued)

*Primary Examiner* — Joseph S Del Sole
*Assistant Examiner* — Manley L Cummins, IV (57) ABSTRACT

Thermocouples and their associated thermocouple junctions can be integrated via freeform fabrication into various parts of injection-molding apparatuses, including the nozzles. Unitary monolithic integration of thermocouples allows thermocouple junctions to be located highly proximate to the locations where temperature monitoring is desired, particularly, near the tips of injection-molding nozzles, which has conventionally been difficult or impossible to achieve. An injection-molding nozzle with one or more integrated thermocouples, a hot-runner manifold with injection-molding nozzles, having integrated thermocouples, monolithically integrated with the manifold as a single part using a freeform fabrication process, and a separately formed injection-molding nozzle having at least one integrated thermocouple and
(Continued)

a robust electrical connection are presented according to various aspects of the invention.

14 Claims, 5 Drawing Sheets

(52) U.S. Cl.
CPC ............... *B29C 2945/7628* (2013.01); *B29C 2945/76274* (2013.01); *B29C 2945/76277* (2013.01)

(56) References Cited

U.S. PATENT DOCUMENTS

| | | | |
|---|---|---|---|
| 6,214,279 B1 | 4/2001 | Yang et al. | |
| 6,220,851 B1* | 4/2001 | Jenko | B29C 45/27 264/328.15 |
| 6,305,923 B1* | 10/2001 | Godwin | B29C 45/1603 425/143 |
| 6,394,784 B1* | 5/2002 | Gellert | B23P 15/007 264/328.15 |
| 6,649,095 B2* | 11/2003 | Buja | B29C 45/76 264/328.1 |
| 7,137,806 B2* | 11/2006 | Babin | B29C 45/2737 425/549 |
| 8,033,722 B2 | 10/2011 | Kulkarni et al. | |
| 2004/0185137 A1* | 9/2004 | Hashemi | B29C 45/2737 425/549 |
| 2006/0263469 A1* | 11/2006 | Feick | B23P 15/007 425/572 |
| 2010/0272849 A1 | 10/2010 | Kaushal et al. | |
| 2012/0156323 A1* | 6/2012 | MacLeod | B29C 45/30 425/562 |
| 2012/0237631 A1* | 9/2012 | Jenko | B29C 45/27 425/547 |

OTHER PUBLICATIONS

International Search Report, dated Dec. 16, 2014, 3 pages.
European Search Report, dated May 11, 2017, 8 pages.

* cited by examiner

INJECTION-MOLDING APPARATUSES CONTAINING INTEGRALLY FORMED THERMOCOUPLES

FIELD OF THE INVENTION

The present invention generally relates to the field of injection molding. In particular, the present invention is directed to injection-molding apparatuses containing integrally formed thermocouples.

BACKGROUND

Injection-molding systems for making molded items often include an injection-molding machine, mold plates, and a hot-runner assembly containing a heated manifold that distributes one or more molten materials, or one or more "melts," such as one or more plastics, from an injection-molding machine to injection-molding nozzles via a network of melt-channels within the manifold. Each melt is intermittently delivered to one or more mold cavities via the injection-molding nozzles. Nozzles may be of either a valve-gated type or a hot-tip type and are conventionally formed separately from the manifold and secured thereto by suitable means. The melt in each melt-channel is typically heated using electrical heaters located on the exterior of the manifold, and, it is important to ensure that the melt in the melt channels, including the channels in the tips of the nozzles, remains at the proper temperature.

SUMMARY OF THE DISCLOSURE

It is understood that the scopes of various aspects of the present invention are limited to the scopes provided by the independent claims, and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted).

In one implementation, the present disclosure is directed to an injection-molding apparatus. The apparatus includes a body manufactured using one or more freeform fabrication processes so as to make the body unitary monolithic. The body includes at least one melt channel, and a thermocouple having a thermocouple junction formed unitary-monolithically with the body.

In another implementation, the present disclosure is directed to a method of manufacturing a unitary-monolithically formed injection-molding apparatus. The method includes freeform fabricating an injection-molding apparatus including at least one melt channel, and freeform fabricating a thermocouple junction integrally formed with the injection-molding apparatus.

These and other aspects and features of non-limiting embodiments of various aspects of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In some aspects, the present invention is directed to injection-molding apparatuses containing integrally formed thermocouples and methods of making such apparatuses. In exemplary embodiments according to the invention, these apparatuses may be manufactured, either in whole or in part, using one or more freeform fabrication processes. By using such process(es) to manufacture injection-molding apparatuses according to aspects of the invention, thermocouples and their associated thermocouple junctions can be integrated into various parts of apparatuses, including nozzles and hot-runner manifolds. This allows for accurate monitoring and control of the temperature throughout the injection molding apparatus and, particularly, near the tips of injection-molding nozzles, which has conventionally been difficult or impossible to achieve. This is so because, using integrated formation techniques described herein, the thermocouple junctions can be located very close to the melt channels they are intended to monitor. Additionally, the expensive, time-consuming additional step of assembly by skilled technicians required in manufacturing conventional injection-molding apparatuses from individually fabricated parts can be partially or wholly avoided. Furthermore, integrating thermocouples and associated wiring into injection-molding-apparatus components minimizes external placement of same, eliminating or at least reducing the likelihood of damage thereto from contact with other objects.

Aspects of the invention also allow for individual features of the apparatuses to be manufactured with more accuracy and precision due to the partial or complete elimination of the known cumulative error that results from fabricating parts of a machine individually. Additional benefits of injection-molding apparatuses containing integrally formed thermocouples of the present disclosure can include, but not be limited to, savings in manufacturing costs, savings in materials, reductions in weight, and, the ability to optimize configurations to operating conditions. After reading this entire disclosure, those skilled in the art will readily appreciate how the present invention can allow injection-molding-equipment designers and manufactures to obtain the foregoing and other benefits.

Injection-molding apparatuses containing integrally formed thermocouples according to the invention may be manufactured, at least in part, in accordance with one or more additive manufacturing fabrication processes, which may also be referred to as "solid freeform fabrication processes." Solid freeform fabrication (SFF) refers to any one of the techniques in a collection of techniques for manufacturing solid objects by the sequential delivery of energy and/or material to specified points in space to produce that object. SFF is sometimes referred to as "rapid prototyping," "rapid manufacturing," "layered manufacturing," and "additive fabrication." It will be appreciated that SFF is sometimes referred to as freeform manufacturing (FFF). The following are a number of typical techniques for SFF that may be suitable for use in making injection-molding apparatuses of the present invention, though there are others: (A) electron beam melting (fully fused void-free solid metal parts from powder stock); (B) electron beam freeform fabrication (fully fused void-free solid metal parts from wire feedstock); (C) laser-engineered net shaping (a laser is used to melt metal powder and deposit it on the part directly; this has the advantage that the part is fully solid and the metal alloy composition can be dynamically changed over the volume of the part); (D) POLYJET MATRIX (the first technology that enables simultaneous jetting of multiple types of materials); (E) selective laser sintering (selective laser sintering uses a laser to fuse powdered metal, nylon, or elastomer; additional processing is necessary to produce fully dense metal part); and (F) shape deposition manufacturing (part and support materials are deposited by a printhead and then machined to near-final shape).

Another example of a manufacturing method for making injection-molding apparatuses containing integrally formed thermocouples is to use a non-solid freeform fabrication, such as casting. Casting is a manufacturing process by which a liquid material is usually poured into a mold, which contains a hollow cavity of the desired shape, and then allowed to solidify. The solidified part is also known as a casting, which is ejected or broken out of the mold to complete the process. Casting materials are usually metals or various cold setting materials that cure after mixing two or more components together; examples are epoxy, concrete, plaster and clay. Casting is most often used for making complex shapes that would be otherwise difficult or uneconomical to make by other methods. In many cases, selective laser sintering (SLS) may be preferable due to the fact that it does not require support structures. Parts being constructed via SLS are surrounded by unsintered powder at all times; this allows for the construction of complicated geometries.

Turning now to the figures, and noting that the first digit of each element numeral corresponds to the figure number in which the corresponding element is first seen, FIGS. 1-4 illustrates an injection-molding nozzle, in particular a hot-tip nozzle 100, made in accordance with the present invention. In this example, nozzle 100 includes a body 104 and a thermocouple 200 (FIG. 2) integrated into the body. As described below in more detail, nozzle 100 and each of its components can be formed as a unitary monolithic body using one or more suitable fabrication techniques, such as one or more of the SFF casting techniques noted above. In this example, other parts and features of nozzle 100 include: a melt channel 204 (FIG. 2); a heater 108 for providing heat to the melt (not shown) present in the melt channel during use; a manifold interface 112, for example, for engaging the nozzle with a hot-runner manifold (not shown) in a finished hot-runner assembly; electrical contacts 116(1) and 116(2) for electrically connecting thermocouple 200 to suitable temperature measuring circuitry 120; a tip 124; and at least one orifice 128 in the tip for communicating melt in the melt channel to a mold cavity (not shown). Each of these features is generally known in the art. However, in the present embodiment, electrical contacts 116(1) and 116(2) are formed integrally with other parts of nozzle 100 using one or more monolithic fabrication techniques.

Figure 2:
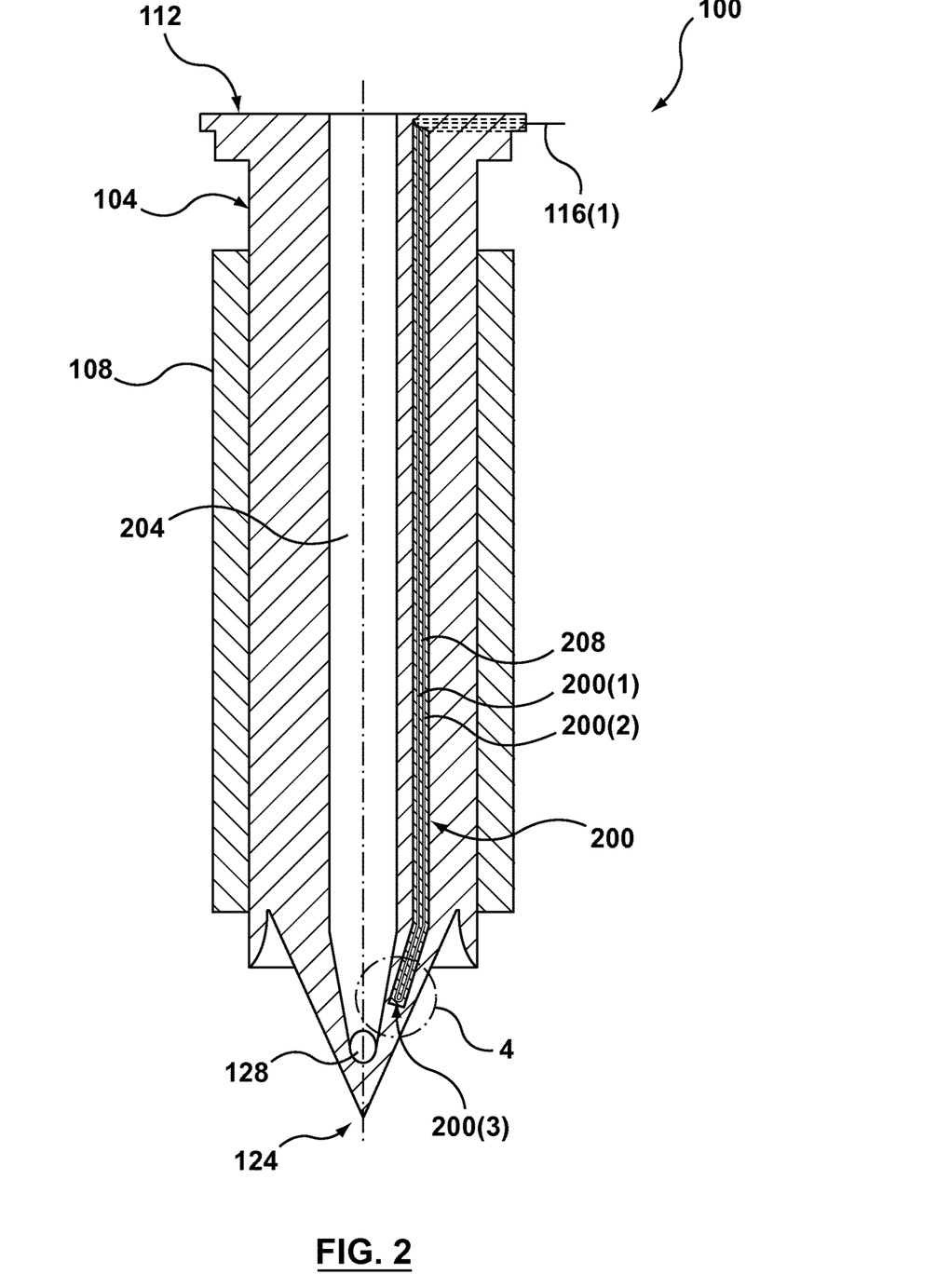
FIG. 2 is a longitudinal cross-sectional view of the freeform-fabricated nozzle of FIG. 1 as taken along line 2-2.
Figure 3:
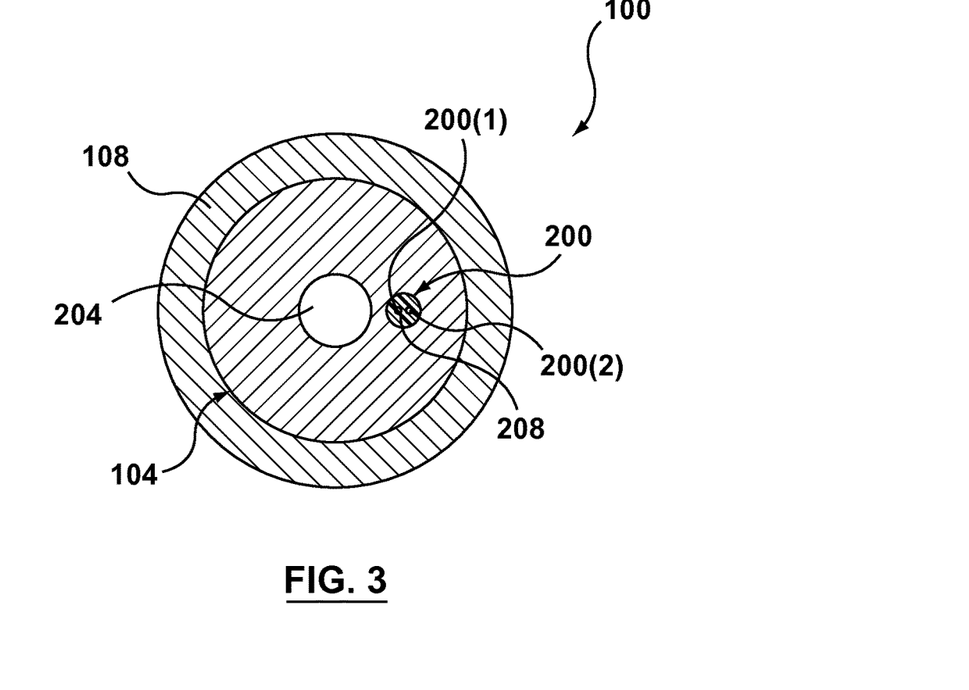
FIG. 3 is a transverse cross-sectional view of the freeform-fabricated nozzle of FIG. 1 as taken along line 3-3.
Figure 4:
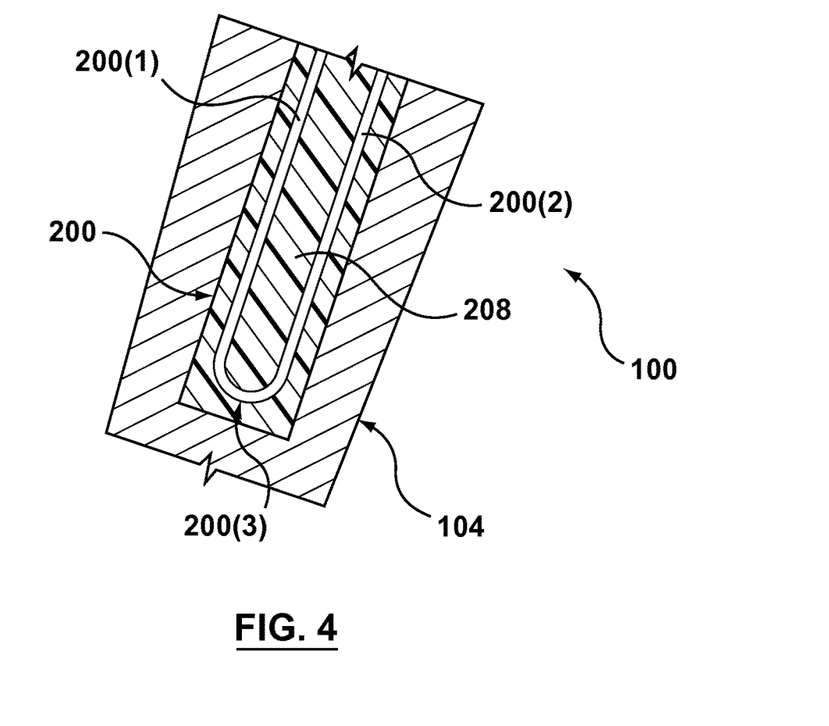
FIG. 4 is an enlarged cross-sectional view of the bimetallic junction of the thermocouple located at the tip of the freeform-fabricated nozzle of FIG. 1 and shown within circular area 4 of FIG. 2.

As illustrated in FIGS. 2-4, thermocouple 200 comprises two dissimilar conductors, particularly thermocouple conductors 200(1) and 200(2), which form a thermocouple junction 200(3) (FIGS. 2 and 4), which in this example is located proximate to nozzle tip 124 (FIG. 2) so as to be able to acquire temperature readings as close to tip 124 and melt channel 204 as practicable. Those skilled in the art will readily appreciate, though, that the thermocouple may be implemented in any other suitable fashion and the thermocouple junction may be located at any location within nozzle 100 or in another part of the injection-molding apparatus, such as a hot-runner manifold, depending on the requirements of the particular molding operation. In this example wherein body 104 of nozzle 100 is made of metal and as seen in FIG. 2, thermocouple conductors 200(1) and 200(2) are encased within a dielectric material 208 so that they are electrically insulated from one another and also from the metal from which the body of the nozzle is formed. The particular configuration of dielectric material 208 shown is merely exemplary; in other embodiments electrical separation of conductors 200(1) and 200(2) can be achieved in other manners, such as by encasing them in separate dielectric "sleeves," among others.

Various freeform fabrication techniques can allow for the monolithic integration of more than one material into an injection-molding apparatus, such as nozzle 100, for the creation of such a monolithic structure having one or more integrated thermocouples, such as thermocouple 200. For example, for powder-fusion techniques, at an appropriate time, the type of powder deposited prior to fusing can be changed either locally to each region where the material is desired or globally to an entire fabrication bed, depending upon the type of equipment used. Specifically, in one example of fabricating nozzle 100 of FIGS. 1-4 using such a technique, body 104 is formed by depositing and fusing a powder of a first metal type in the requisite regions, dielectric material 208 is formed by depositing and fusing a powder of a dielectric material in the requisite regions, thermocouple conductor 200(1) and corresponding electrical contact 116(1) are formed by depositing and fusing a powder of a second metal type in the requisite regions, thermocouple conductor 200(2) and corresponding electrical contact 116(2) are formed by depositing and fusing a powder of a third metal type in the requisite regions, and heater 108 is formed by depositing a suitable electrically resistive material in the requisite regions. As another example, for molten wire techniques, the type of wire used can be changed at each region where the particular material is needed. After reading this entire disclosure, those skilled in the art will understand how to select the appropriate materials and appropriate fabrication process(es) for making an injection-molding apparatus containing an integrally formed thermocouple according to the present disclosure.

Figure 1:
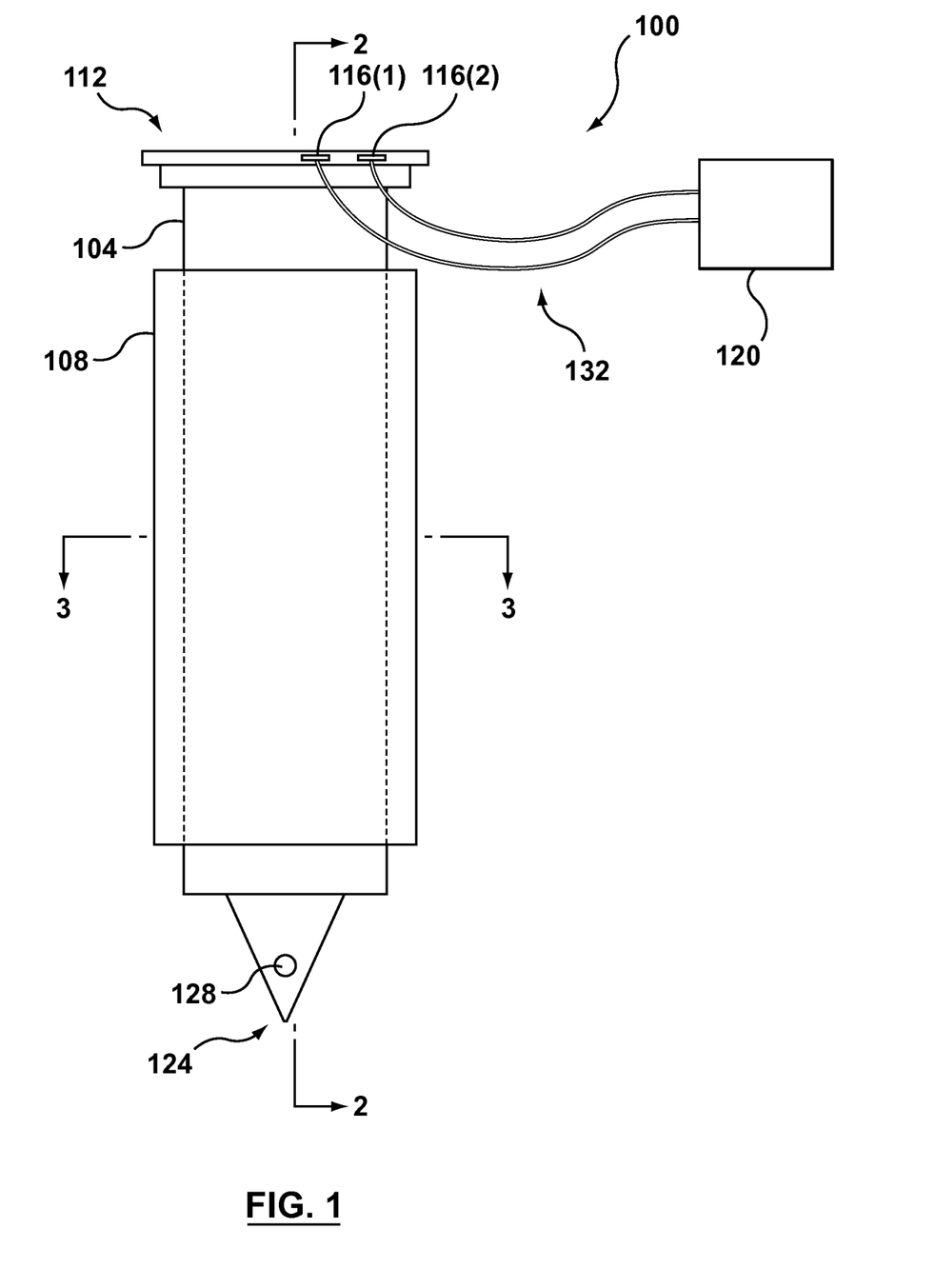
FIG. 1 is an elevational exterior view of a freeform-fabricated, hot-tip nozzle containing an integrated thermocouple.

As seen in FIG. 1, one or more connecting cables 132 can be used to electrically connect thermocouple 200 to temperature measuring circuitry 120 via electrical contacts 116(1) and 116(2). Depending on the configuration of electrical contact 116(1) and 116(2), connecting cable(s) 132 can be made of off-the-shelf type standard components, if desired. As those skilled in the art will readily appreciate, thermocouple junction 204 can be any suitable junction, such as a "J" type junction of iron on the one side (e.g., conductor 200(1)) and constantan on the other side (e.g., conductor 200(2)), a "K" type junction of chromel on one side and alumel on the other, or an "E" type junction of chromel on one side and constantan on the other. Those skilled in the art will readily appreciate that these junction types are merely exemplary and that the conductive materials of the junction may be any materials that suit the necessary junction properties and the process(es) used to form components of nozzle 100 monolithically with one another.

Figure 5:
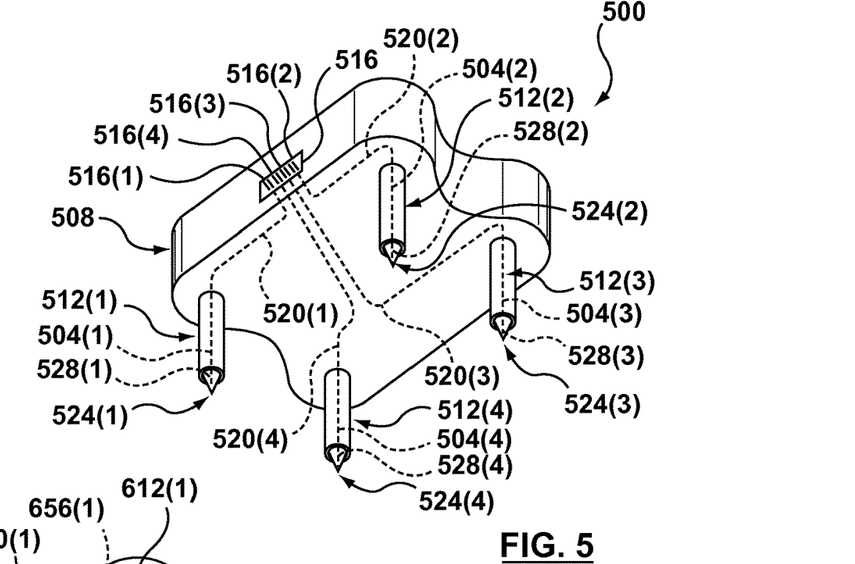
FIG. 5 is a 3-D perspective view of a freeform-fabricated manifold/nozzle combination in which all of the nozzles have integrated thermocouples.

FIG. 5 illustrates an injection-molding apparatus according to another aspect of the invention, particularly a free-form-fabricated, unitary monolithic manifold/nozzle apparatus 500 with integrated thermocouples 504(1) to 504(4). In this example, unitary monolithic apparatus 500 includes a hot-runner manifold portion 508 and four nozzles 512(1) to 512(4) monolithically formed with the manifold portion using one or more suitable monolithic forming techniques, such as any one or more of the SFF techniques mentioned above, among others. Each nozzle 512(1) to 512(4) has a corresponding one of integrally formed thermocouples 504(1) to 504(4) wired to a respective pair 516(1) to 516(4) electrical contacts located within a connector region 516 on the exterior of the manifold via electrical conductor structures 520(1)-520(4) that are monolithically formed within manifold portion 508. As those skilled in the art will readily appreciate, one or more appropriately configured connectors (not shown) can be used to engage pairs 516(1) to 516(4) to electrical connect thermocouples 504(1) to 504(4) to appropriate temperature measuring circuitry (not shown).

In the embodiment shown in FIG. 5, each of thermocouples 504(1) to 504(4) is provided for the same purpose as thermocouple 200 of FIGS. 2 to 4, i.e., to allow for measurement of the melt in the melt channels proximate to the corresponding respective nozzle tips 524(1) to 524(4) of nozzles 512(1) to 512(4). In this connection, each thermocouple 504(1) to 504(4) includes a thermocouple junction 528(1) to 528(4) located as close to the corresponding melt channel and as near the corresponding nozzle tip 524(1) to 524(4) as practicable. As noted above relative to thermocouple junction 204 of FIGS. 2 and 4, each thermocouple junction 528(1) to 528(4) may be made of any two suitable electrically conductive materials, such as the chromel, constantan, iron, and alumel materials noted above relative to the J-, K- and E-type thermoelectric junctions, among others. Also similar to the exemplary fabrication processes noted above relative to nozzle 100 of FIG. 1, unitary monolithic apparatus 500 can be fabricated using the same or similar techniques. In this connection, while not illustrated in such detail in FIG. 5, electrical conductor structures 520(1) to 520(4) can be formed monolithically with the rest of manifold portion 508 using techniques such as powder-fusion techniques and/or melted-wire techniques using suitable powder and/or wire materials and suitable fusing and/or melting techniques. In addition, each electrical conductor structure 520(1) to 520(4) may be configured in any suitable manner, such as the dual conductors encased in a common dielectric "channel" configuration as shown in FIGS. 2-4 or as separate conductors encased in respective dielectric sleeves, among others. Both of these configurations are suitable for use with manifolds made of one or more conductive metals. Those skilled in the art will readily appreciate the various ways that electrical conductor structure 520(1) to 520(4) can be integrated into manifold portion 508 and nozzles 512(1) to 512(4).

FIGS. 1 to 4 depict a fairly conventional hot-tip nozzle 100 that is not integrally formed with a hot-runner manifold but that includes a monolithically integrated internal thermocouple 200, with the thermocouple junction 204 being precisely located proximate to tip 124 of the nozzle. As also described above, nozzle 100 also includes a pair of electrical contacts 116(1) and 116(2) for thermocouple 200 located externally relative to the nozzle. While such a location of the electrical contacts 116(2) and 116(2) may be well-suited to some applications, the fact that they protrude from nozzle 100 make them vulnerable to damage and therefore not well-suited to other applications.

Figure 6A:
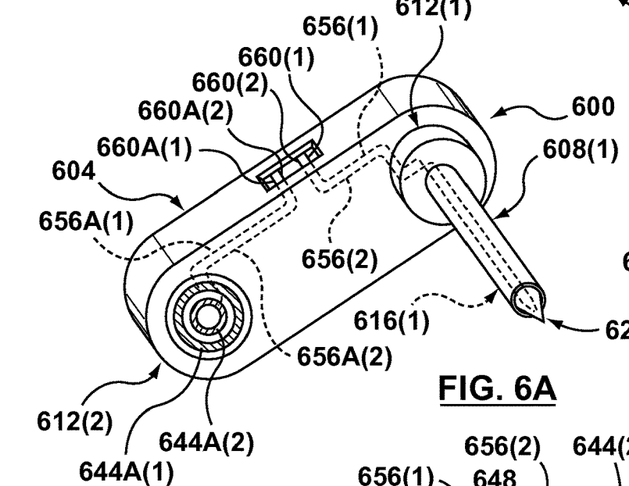
FIG. 6A is a 3-D perspective view of a freeform-fabricated manifold for use with freeform-fabricated modular nozzles with one of two nozzles installed.
Figure 6B:
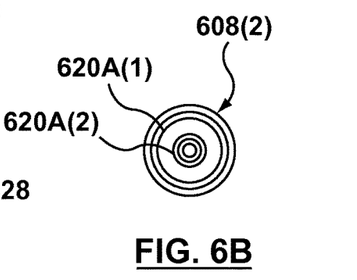
FIG. 6B is a top view of a freeform-fabricated nozzle for use with the manifold of FIG. 6A.
Figure 6C:
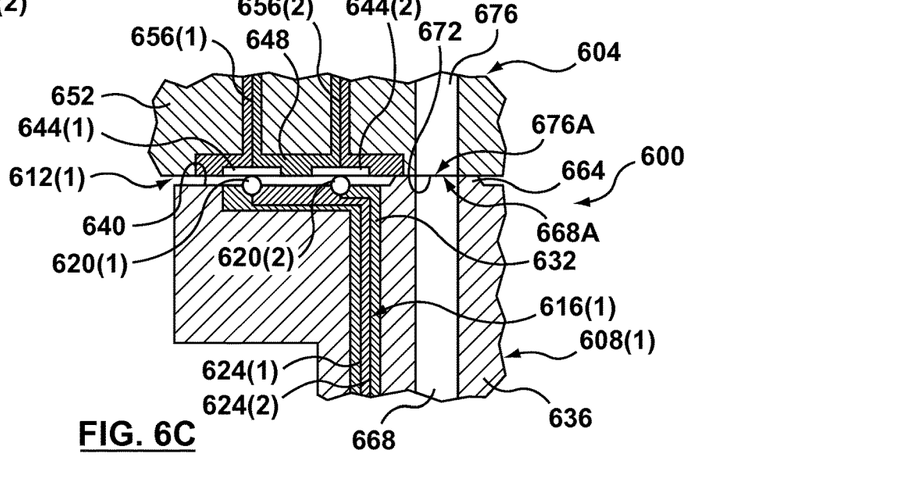
FIG. 6C is a longitudinal cross-sectional view of the interface between the manifold and the modular nozzle of FIG. 6A.

FIGS. 6A to 6C, on the other hand, depict an injection-molding apparatus 600 that is particularly configured to protect the thermocouple connections from damage that can occur to protruding connections. As seen in FIG. 6A, injection-molding apparatus includes a hot-runner manifold 604 and a pair of separately formed injection nozzles, though FIG. 6A shows only one nozzle 608(1), here a hot-tip nozzle, located in its in-use position relative to the manifold, with the second nozzle 608(2) (shown in FIG. 6B) removed in FIG. 6A to reveal one of the two nozzle-engagement regions, here nozzle-engagement region 612(2) on the manifold that receive a corresponding one of the nozzles. Nozzle engagement region 612(1) is not visible in FIG. 6A, but rather is depicted in FIG. 6C along with corresponding nozzle 608(1). As described in more detail below, each nozzle engagement region 612 is particularly configured to allow the electrical connections between each nozzle 608(1), 608(2) and the corresponding nozzle-engagement region 612(1), 612(2) for the thermocouples 616(1) and 616(2) (not shown) to be concealed and to allow components of the electrical connection to be configured to resist damage.

Referring to FIG. 6C, thermocouple 616(1) of nozzle 608(1) includes a pair of ring-shaped electrical contacts 620(1) and 620(2) (see also FIG. 6B, which shows a similar pair of ring-shaped electrical contacts 620A(1) and 620A(2) on nozzle 608(2)) and a corresponding pair of conductors 624(1) and 624(2) electrically connecting the electrical contacts to a thermocouple junction 628 (FIG. 6A), which can be the same as or similar to thermocouple junction 200(3) of FIGS. 2 to 4. As seen in FIG. 6C, electrical conductors 624(1) and 624(2) are encased in a dielectric material 632 to electrically insulate them from one another and also from the metal body 636 of nozzle 608(1). Electrical contacts 620(1) and 620(2) extend beyond an upper surface 640 ("upper" relative to FIG. 6C) to allow them to contact, correspondingly respectively, a pair of annular electrical contacts 644(1) and 644(2) integrally formed with manifold 604. In the example shown, annular contacts 644(1) and 644(2) are embedded in a dielectric material 648 integrally formed with manifold 604 to electrically insulate these contacts from one another and also from the metal body 652 (FIG. 6C) of manifold 604. A pair of conductors 656(1) and 656(2) (FIGS. 6C and 6A) electrically connect corresponding respective contacts 644(1) and 644(2) with connectors 660(1) and 660(2) provided for electrically connecting thermocouple 616(2) to suitable temperature measuring circuitry (not shown). A similar pair of conductors 656A(1) and 656A(2) (FIG. 6A) electrically connect corresponding respective contacts 644A(1) and 644A(2) with connectors 660A(1) and 660A(2) provided for electrically connecting thermocouple 616(2) (not shown) to suitable temperature measuring circuitry (not shown). In the embodiment shown, each of conductors 656(1) and 656(2) is individually encased in dielectric material 648 so as to be separated from one another by an intervening portion of metal body 652 of manifold 604. However, in alternative embodiments, conductors 656(1) and 656(2) may be encased together in a common mass of a dielectric material.

In the example shown, manifold 604 and nozzles 608(1) and 608(2) are particularly configured to be installed in a hot-runner assembly (not shown) in a manner that the contact between electrical contacts 620(1) and 620(2) and electrical contacts 644(1) and 644(2) for nozzle 608(1) (as well as for electrical contacts 620A(1) and 620A(2) and electrical contacts 644A(1) and 644A(2) for nozzle 608(2)) is due to compressive force induced by other components of the hot-runner assembly, such as a manifold-cavity plate, backing plate, etc. In addition, this compressive arrangement is also used to ensure a fluid seal between each nozzle 608(1), 608(2) and manifold 604, as illustrated in FIG. 6C. Referring to FIG. 6C, in the embodiment shown, nozzle 608(1) includes an annular boss 664 surrounding the inlet 668A of melt channel 668 formed in nozzle 608(1). Boss 664 is designed and configured to sealingly engage the surface 672 surrounding the outlet 676A of melt channel 676 formed in manifold 604. As those skilled in the art will readily appreciate, this type of compressive engagement and sealing can allow for sliding between boss 664 and surface 672 to accommodate thermal movement that can occur during use. In other embodiments, each of nozzles 608(1) and 608(2) can be positively secured to manifold 604, such as by screw threading, threaded fasteners, welding, and/or any other suitable means.

Those skilled in the art will readily appreciate that each of the unitary monolithic nozzles 608(1), 608(2) and manifold 604 can be fabricated using any suitable one or more of the additive manufacturing processes described above, including the powder- and wire-based processes specifically described above relative to nozzle 100 of FIGS. 1-4, with appropriate substitution of components of nozzle 100 with like components of nozzles 608(1), 608(2) and manifold 604.

Figure 7:
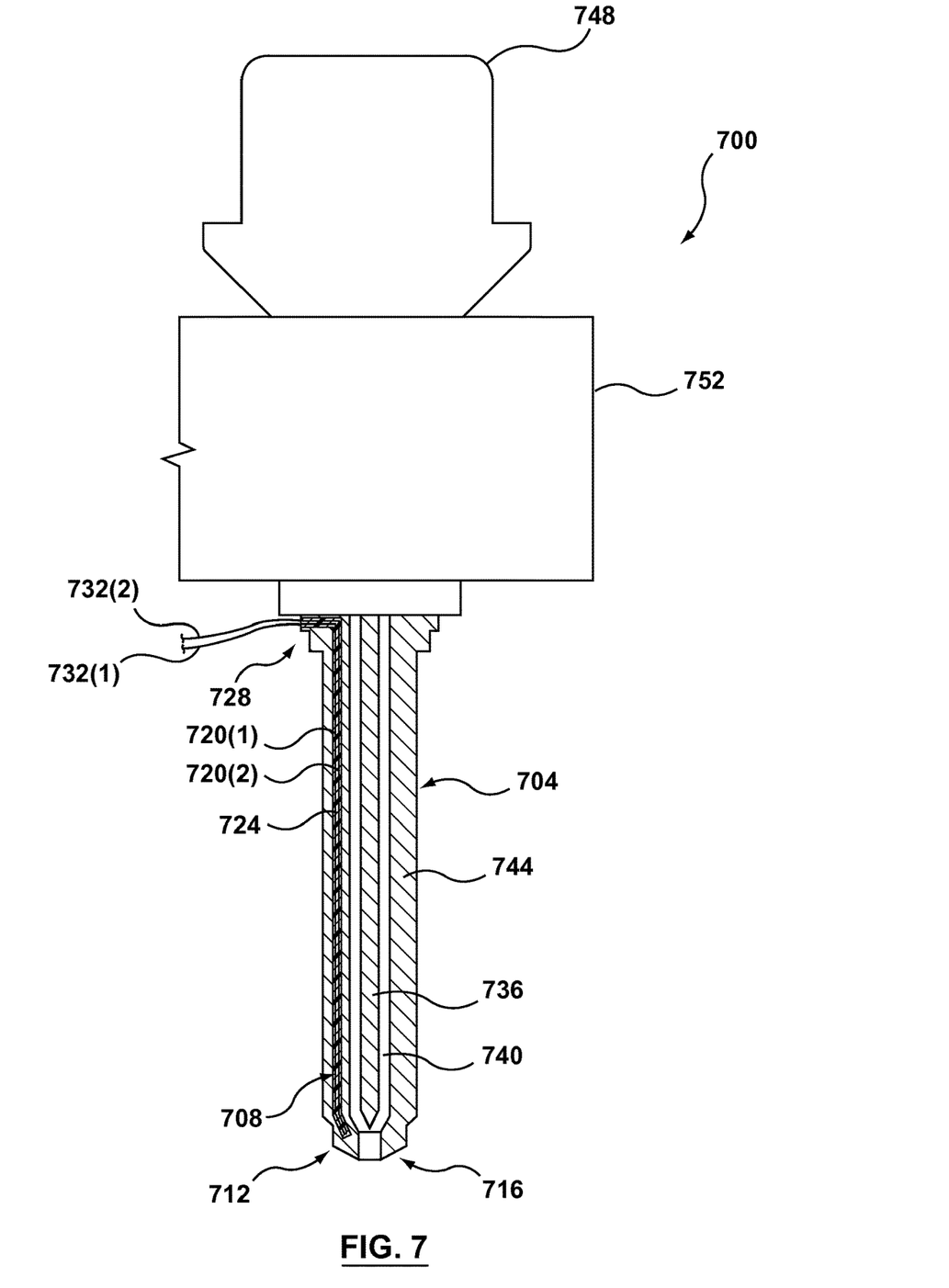
FIG. 7 is a longitudinal cross-sectional view of a valve-gated nozzle containing an integrated thermocouple.

While FIGS. 1 to 6C are directed to hot-tip nozzles, FIG. 7 illustrates an injection-molding apparatus 700 that includes a valve-gated nozzle 704 having an integrated internal thermocouple 708. As those skilled in the art will readily appreciate, thermocouple 708 can be monolithically integrated into nozzle 704 using any one or more of the additive manufacturing techniques above, including, but not limited to, the fused-powder and melted wire techniques particularly noted relative to nozzle 100 of FIGS. 1-4. It is also noted that while only a single thermocouple 708 is shown with its thermocouple junction 712 located near the tip 716 of nozzle 704, in other embodiments a similar nozzle (as well as any hot-tip nozzle) may have more than one thermocouple, with each of the thermocouples being located at any desired location from which temperature readings are desired.

In the embodiment shown, thermocouple 708 is located and executed in virtually the same manner as thermocouple 200 of FIGS. 2-4, with the primary difference being that nozzle 704 of FIG. 7 is a valve-gated nozzle and nozzle 100 of FIGS. 1 to 4 is a hot-tip nozzle. In other words, thermocouple 708 includes a pair of electrical conductors 720(1) and 720(2) encased within a dielectric material 724 and that electrically connect thermocouple junction 712 to a pair 728 of electrical contacts that electrically connect to electrical conductors 732(1) and 732(2) that connect the thermocouple to suitable temperature measuring circuitry (not shown). While known to those skilled in the art, for the sake of completeness, other components of injection-molding apparatus 700 of FIG. 6 include: a valve stem 736 located in a melt channel 740 within a nozzle body 744 of nozzle 704; a valve actuator 748, such as a pneumatic, hydraulic, or electric, actuator, for actuating the valve stem; and a hot-runner manifold 752 for feeding one or more melts (not shown) to the nozzle.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An injection-molding apparatus, comprising:
   a nozzle including a nozzle body manufactured using one or more freeform fabrication processes so as to make said nozzle body unitary monolithic, said nozzle body defining a gate engagement plane for engaging a gate of a mold, and further comprising:
   at least one melt channel;
   a nozzle tip comprising an outlet orifice in fluid communication with said at least one melt channel;
   a thermocouple integrally formed using a freeform fabrication process within and as part of said unitary-monolithic nozzle body, said-thermocouple further comprising a thermocouple junction located within said nozzle tip, downstream of the gate engagement plane and proximate to said at least one melt channel and said outlet orifice; and
   wherein, the freeform fabrication process is at least one of:
   (a) electron beam melting;
   (b) electron beam freeform fabrication
   (c) laser-engineered net shaping
   (d) poly jet matrix
   (e) selective laser sintering, and
   (f) shape deposition manufacturing.

2. The injection-molding apparatus according to claim 1, wherein said thermocouple junction is encased within a dielectric material formed unitary-monolithically within said nozzle tip.

3. The injection-molding apparatus according to claim 2, wherein said thermocouple further includes a pair of electrical conductors extending from said thermocouple junction and formed unitary-monolithically with said nozzle body.

4. The injection-molding apparatus according to claim 3, wherein said pair of electrical conductors are encased within said dielectric material.

5. The injection-molding apparatus according to claim 4, wherein said pair of electrical conductors are encased together within said dielectric material.

6. The injection-molding apparatus according to claim 4, wherein said pair of electrical conductors are encased separately within said dielectric material so as to be separated in part by a portion of said nozzle body.

7. The injection-molding apparatus according to claim 3, further including a pair of external electrical contacts formed unitary-monolithically with said nozzle body, said pair of external electrical contacts electrically connected correspondingly respectively to said pair of electrical conductors.

8. The injection-molding apparatus according to claim 1, further comprising a hot-runner manifold manufactured using one or more freeform fabrication processes so as to make said hot-runner manifold unitary monolithic with said nozzle body.

9. The injection-molding apparatus according to claim 8, wherein said thermocouple junction is encased within a dielectric material formed unitary-monolithically within said nozzle tip.

10. The injection-molding apparatus according to claim 9, wherein said thermocouple further includes a pair of electrical conductors extending from said thermocouple junction and formed unitary-monolithically with each of said nozzle body and said hot-runner manifold.

11. The injection-molding apparatus according to claim 10, wherein said pair of electrical conductors are encased within said dielectric material.

12. The injection-molding apparatus according to claim 11, wherein said pair of electrical conductors are encased together within said dielectric material.

13. The injection-molding apparatus according to claim 11, wherein said pair of electrical conductors are encased separately within said dielectric material so as to be separated in part by a portion of said nozzle body.

14. The injection-molding apparatus according to claim 10, further including a pair of external electrical contacts formed unitary-monolithically with said hot-runner manifold, said pair of external electrical contacts electrically connected correspondingly respectively to said pair of electrical conductors.

* * * * *